E. F. NORTHRUP.
ELECTRICAL MEASURING APPARATUS.
APPLICATION FILED MAY 15, 1917.
1,245,956.
Patented Nov. 6, 1917.
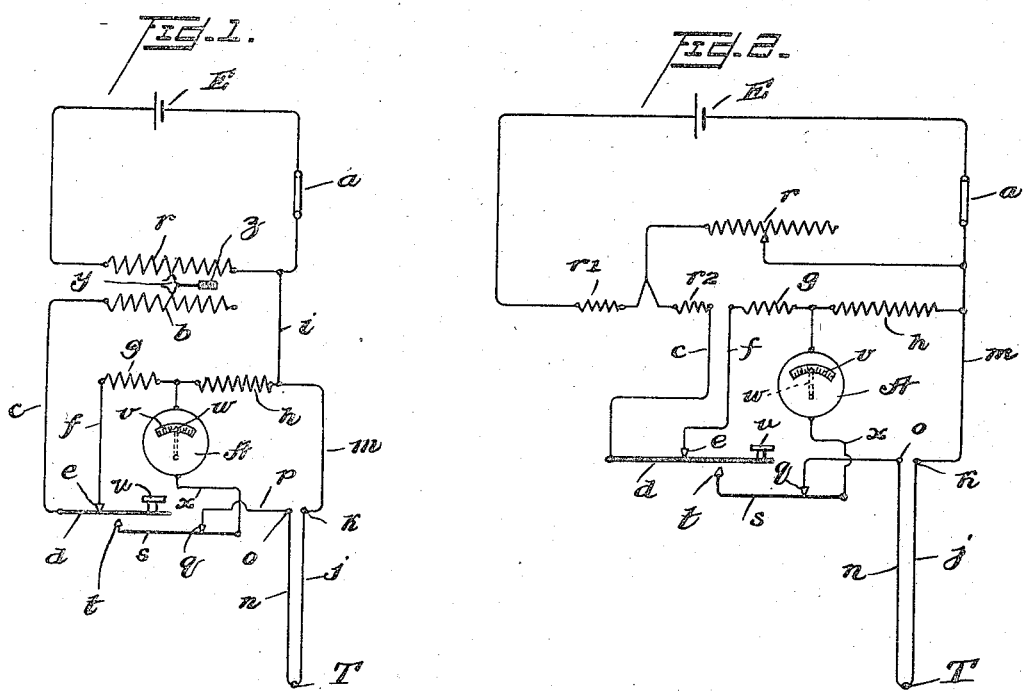
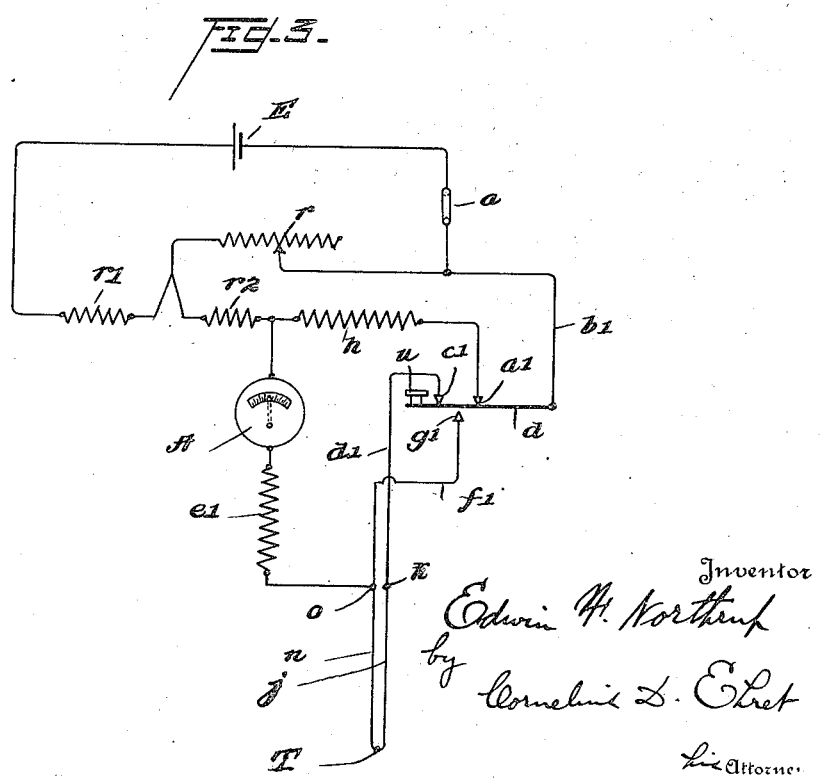

UNITED STATES PATENT OFFICE.

EDWIN F. NORTHRUP, OF PRINCETON, NEW JERSEY, ASSIGNOR TO PYROLECTRIC INSTRUMENT CO., OF TRENTON, NEW JERSEY, A CORPORATION OF NEW JERSEY.

ELECTRICAL MEASURING APPARATUS.

1,245,956.       Specification of Letters Patent.       Patented Nov. 6, 1917.

Application filed May 15, 1917. Serial No. 168,635.

*To all whom it may concern:*

Be it known that I, EDWIN F. NORTHRUP, a citizen of the United States, residing at Princeton, county of Mercer, State of New Jersey, have invented new and useful Electrical Measuring Apparatus, of which the following is a specification.

My invention relates to electrical measuring apparatus and particularly electrical measuring apparatus for determining the magnitude of an unknown electro-motive-force; and when the source of the unknown electro-motive-force is a thermo-couple the measuring apparatus may be used as an electric pyrometer.

My invention resides in electrical measuring apparatus comprising a galvanometer, such as a millivoltmeter, milliammeter, or similar instrument, preferably comprising a coil movable in a permanent magnet field, said galvanometer being connected in series with the source of electro-motive-force of unknown value, together with means for producing a fall or difference of potential equal to the unknown electro-motive-force as indicated by zero deflection of the galvanometer, and means for changing the connections of the galvanometer to such relation that there is passed therethrough the same current which produced the fall or difference of potential equal to the unknown electro-motive-force, whereby the galvanometer indicates by its deflection the value or magnitude of the unknown electro-motive-force, the galvanometer in such case, strictly speaking, being a current measuring or indicating instrument which, however, may be calibrated in units of potential or of temperature.

For an illustration of some of the forms my invention may take, reference is to be had to the accompanying drawing, in which:

Figure 1 is a diagrammatic view of circuits and apparatus embodying my invention.

Fig. 2 is a diagrammatic view of modified circuit arrangements and apparatus embodying my invention.

Fig. 3 is a diagrammatic view of a further modified circuit and apparatus embodying my invention.

Referring to Fig. 1, E is any suitable source of direct current, such as a dry cell or storage battery, which need not be a standard cell or source of unvarying or constant electro-motive-force. Upon closure of the switch $a$, battery E passes current through the resistance $r$. Associated with the resistance $r$, and preferably disposed closely adjacent thereto, is a second resistance $b$ whose one terminal connects through conductor $c$ with the switch lever $d$, which may be a spring having a bias toward the position illustrated in engagement with the contact $e$ connected by conductor $f$ with one terminal of the resistance $g$ whose other terminal connects with one terminal of the resistance $h$ whose remaining terminal connects by conductor $i$ with one terminal of the resistance $r$.

T is a thermo-junction comprising, as well understood in the art, dissimilar metals soldered, welded or otherwise connected together, the thermo-element lead $j$ connecting with terminal or binding post $k$ which is connected by conductor $m$ to one terminal of the resistance $h$, and the other thermo-couple lead $n$ connecting with the terminal or binding post $o$ which is connected by conductor $p$ with the contact $q$ with which the contact spring or lever $s$ is normally in engagement. The spring $s$ carries a contact $t$ normally out of engagement with the contact spring $d$ but adapted to be engaged by the latter when depressed by pressure upon the finger button $u$. A is a galvanometer, such as a milliammeter, and is preferably one comprising a coil movable in a permanent magnet field, as in the well known direct current measuring instruments of the D'Arsonval type. It comprises a scale $v$ and a deflecting needle or pointer $w$ co-acting therewith. The scale $v$ may be calibrated in any desired or suitable units, and though the instrument is used as a current measuring instrument, as a milliammeter, the scale may be calibrated in units of voltage, as millivolts, or in units of temperature, as degrees Fahrenheit or centigrade. One terminal of the instrument A connects to a point between the resistances $g$ and $h$ and its other terminal connects with the contact spring $s$ through the conductor $x$.

Simultaneously engaging and contacting with the resistances $r$ and $b$ is the movable contact $y$ having the operating handle $z$.

The operation is as follows:

With the parts in the normal positions illustrated, the instrument A is employed as a simple galvanometer to determine when the unknown electro-motive-force, as that produced by the thermo-couple T or by any other source of electro-motive-force of unknown value, is equal to the fall of potential through the resistance $h$. This is determined by varying or adjusting the strength of the current passed from the battery E through the resistance $h$ by moving the contact $y$ in one direction or the other along and in contact with the resistances $r$ and $b$. In any position of the contact $y$ it will be found that there is in shunt to that part of the resistance $r$ to the right of the contact $y$ a path comprising that part of resistance $b$ to the left of the contact $y$, the resistance $g$ and the resistance $h$. By suitably adjusting the contact $y$, therefore, it is possible to so adjust or vary the strength of current passing through the resistance $h$ that the difference of potential between its terminals is equal to the voltage or electro-motive-force of the thermo-couple T, dependent upon the difference in temperatures between its hot and cold junctions. This equality between the electro-motive-force produced by the thermo-junction T and the fall of potential in the resistance $h$ exists when the deflection of the instrument A is $nil$ or zero, for in such case the two electro-motive-forces are equal and opposed, and no current passes through the instrument A.

When this balance has been obtained, it is known that the current from the battery E passing through the resistance $h$ is of that magnitude to cause a fall of potential in the resistance $h$ equal to the unknown electromotive-force. Now the operator pushes downwardly upon the button $u$, thereby depressing the contact spring $d$, separating it from the contact $e$ and bringing it into engagement with the contact $t$, and by so doing downwardly deflecting the contact spring $s$ to separate it from the contact $q$. With the parts in this new position, the resistance $g$ is cut out of circuit and the instrument A has been connected in its place in series with the resistance $h$. There accordingly flows through the instrument A and the resistance $h$ a current of the same magnitude that was flowing through the resistance $h$ to cause therein a fall of potential equal to the unknown electro-motive-force. This current causes the instrument A to produce a deflection, and that deflection is an indication of the value of the unknown electro-motive-force; and as previously stated, the scale of the instrument may read in units of electro-motive-force, as millivolts, or in units of temperature, or in any other desired units.

By use of the resistances $r$ and $b$ of suitable values in the relation described with a common contact $y$ movable along them, it is possible to cause the current passing through the resistance $h$ to vary in strength practically directly proportionally to the extent of movement of the contact $y$ along its resistances $r$ and $b$.

The resistance $g$ is equal to the resistance of the instrument A either when the resistance of the instrument A is that of its moving coil, or when there is an additional resistance in circuit with the coil. Besides making the resistance $g$ equal to the resistance of the instrument A, as stated, the temperature co-efficient of the resistance $g$ should preferably be the same as the temperature co-efficient of the resistance of the instrument A. Since an instrument, such as A, generally comprises copper wire in its coil and in any additional resistance that may be used, the resistance $g$ may be made of copper.

The resistance $h$ should be preferably of a material which has a temperature co-efficient which is zero or as small as possible.

The magnitude of the resistance $h$ determines the range of the apparatus, that is, where the range of the apparatus is great or wide, as for measuring potentials or temperatures widely differing from each other, the resistance $h$ is larger than in the case where the range is small.

The instrument A, particularly when of the D'Arsonval type, depends for its constant upon its permanent magnet, which does not vary substantially or materially in strength. The constant of the instrument affects and determines the magnitude of the resistance $h$. Nevertheless, the instrument A may be used as a simple galvanometer, and is sufficiently sensitive for employment in the null method of balancing the fall of potential across resistance $h$ with the unknown electro-motive-force.

In Fig. 2 the battery E is connected in circuit through the switch $a$ and an adjustable resistance $r$ and a resistance $r^1$. In parallel with or in shunt to the adjustable resistance $r$ are the serially connected resistances $r^2$, $g$ and $h$. One terminal of the resistance $r^2$ is connected by conductor $c$ with the contact spring $d$, which is normally in engagement with the contact $e$ connected by conductor $f$ with one terminal of the resistance $g$, as in Fig. 1.

The operation is similar to that described in connection with Fig. 1 in that the resistance $r$ is adjusted until the instrument A is balanced or produces no deflection. Then the button $u$ is depressed with the result that the instrument A is substituted for the resistance $g$ and is then traversed by the same current traversing the resistance $h$, and that current is of the same strength as when balancing the fall of potential across the resistance $h$ with the unknown electro-motive-force; and the deflection of the instrument A is an indication of the value of the unknown electro-motive-force or of the temperature of the thermo-couple.

In this case again the resistances $g$ and $h$ are of the character and magnitudes described in connection with Fig. 1.

In Fig. 3 the battery E is connected in circuit through the switch $a$ with the variable resistance $r$ and the resistance $r^1$. In shunt to the variable resistance $r$ are the serially connected resistances $r^2$ and $h$, one terminal of the latter connecting with the contact $a^1$ with which the contact spring $d$ normally engages, the contact spring $d$ being connected by conductor $b^1$ with one terminal of the variable resistance $r$. The contact spring $d$ also normally engages a contact $c^1$ connected by conductor $d^1$ with the thermo-couple terminal $k$. The instrument A, of the character hereinbefore described, is connected in series with the resistance $e^1$ and the thermo-couple T between the contact $c^1$ and a point between the resistances $r^2$ and $h$. The terminal $o$ of the thermo-couple connects by conductor $f^1$ with the contact $g^1$ normally out of engagement with the spring $d$.

The operator adjusts the resistance $r$ until the fall of potential across the resistance $h$ is equal to that produced by the thermo-couple T or any other source of electro-motive-force of unknown value, the instrument A, resistance $e^1$, and thermo-couple T being connected in series with each other and in parallel with the resistance $h$. After this balance has been obtained, as indicated by zero deflection of the instrument A, the operator pushes downwardly upon the button $u$, deflecting the spring $d$ downwardly away from contacts $a^1$ and $c^1$ and into engagement with contact $g^1$, with the result that the instrument A and its associated resistance $e^1$ are now connected in series with the resistance $r^2$, in place of the resistance $h$, in shunt with the variable resistance $r$.

The resistance of the instrument A plus the resistance $e^1$ being equal to the resistance $h$, after the substitution has been made as described, a current of the same magnitude flows in the branch in parallel to the resistance $r$ as when the electro-motive-forces were balanced, and therefore the instrument A is traversed by a current of that magnitude. It accordingly deflects, and its deflection indicates the value of the unknown electro-motive-force of or the temperature of the thermo-couple.

In this case the resistance $h$, in addition to being equal to the sum of the resistance of instrument A and the resistance $e^1$, preferably has the same temperature co-efficient as the combined resistance of the instrument A and resistance $e^1$.

In the arrangement of Fig. 3, as in Figs. 1 and 2, the resistance $h$ determines the range of the apparatus; or otherwise stated, the magnitude of the resistance $h$ is chosen to accord with the desired range of the measuring apparatus.

In all the cases hereinbefore described, it will be noted that the instrument A is first used as a null method galvanometer and then is transferred, by suitable switching means, into position where it is traversed by a current of the same magnitude which produced the fall of potential equal to the unknown electro-motive-force. In such position it operates in a sense as an ammeter or milliammeter, its deflection being dependent upon the value of the current employed for balancing purposes.

What I claim is:

1. The combination with a resistance, of a galvanometer and a source of electro-motive-force of unknown value connected in series with each other and in parallel with said resistance, means for passing through said resistance a current of magnitude causing in said resistance a fall of potential equal to the unknown electro-motive-force of said source, and means for disconnecting said source of electro-motive-force of unknown value and for connecting said galvanometer in a circuit relation wherein it is traversed by a current of said magnitude, whereby said galvanometer produces a deflection indicative of the value of the unknown electro-motive-force.

2. The combination with a resistance, of a galvanometer and a source of electro-motive-force of unknown value connected in series with each other and in parallel with said resistance, said galvanometer comprising a coil movable in a permanent magnet field, means for passing through said resistance a current of magnitude causing in said resistance a fall of potential equal to the unknown electro-motive-force of said source, and means for disconnecting said source of electro-motive-force of unknown value and for connecting said galvanometer in a circuit relation wherein it is traversed by a current of said magnitude, whereby said galvanometer produces a deflection indicative of the value of the unknown electro-motive-force.

3. The combination with a circuit including a source of current and resistance, of a branch circuit connected in parallel with a part of said circuit, a second resistance in said branch circuit, a galvanometer and a source of electro-motive-force of unknown value connected in series with each other and in parallel with said second resistance, means for adjusting the strength of current in said second resistance to a magnitude causing therein a fall of potential equal to the unknown electro-motive-force of said source, and means for disconnecting said source of electro-motive-force of unknown value and for connecting said galvanometer in series with said branch circuit.

4. The combination with a circuit including a source of current and resistance, of a branch circuit connected in parallel with a part of said circuit, a second resistance in said branch circuit, a galvanometer and a source of electro-motive-force of unknown value connected in series with each other and in parallel with said second resistance, said galvanometer comprising a coil movable in a permanent magnet field, means for adjusting the strength of current in said second resistance to a magnitude causing therein a fall of potential equal to the unknown electro-motive-force of said source, and means for disconnecting said source of electro-motive-force of unknown value and for connecting said galvanometer in series with said branch circuit.

5. The combination with a plurality of resistances connected in series with each other, of a galvanometer and a source of electro-motive-force of unknown value connected in series with each other and in parallel with one of said resistances, means for passing through said resistances a current of magnitude causing in said one of said resistances a fall of potential equal to the unknown electro-motive-force of said source, a second of said resistances having a magnitude equal to the resistance of said galvanometer, and means for disconnecting said source of electro-motive-force of unknown value and for connecting said galvanometer in series with said one of said resistances in place of said second of said resistances, whereby said galvanometer produces a deflection indicative of the value of the unknown electro-motive-force.

6. The combination with a plurality of resistances connected in series with each other, of a galvanometer and a source of electro-motive-force of unknown value connected in series with each other and in parallel with one of said resistances, said galvanometer comprising a coil movable in a permanent magnet field, means for passing through said resistances a current of magnitude causing in said one of said resistances a fall of potential equal to the unknown electro-motive-force of said source, a second of said resistances having a magniture equal to the resistance of said galvanometer, and means for disconnecting said source of electro-motive-force of unknown value and for connecting said galvanometer in series with said one of said resistances in place of said second of said resistances, whereby said galvanometer produces a deflection indicative of the value of the unknown electro-motive-force.

7. The combination with a plurality of resistances connected in series with each other, of a galvanometer and a source of electro-motive-force of unknown value connected in series with each other and in parallel with one of said resistances, said one of said resistances having a temperature coefficient which is practically *nil*, means for passing through said resistances a current of magnitude causing in said one of said resistances a fall of potential equal to the unknown electro-motive-force of said source, a second of said resistances having a magnitude equal to the resistance of said galvanometer, and means for disconnecting said source of electro-motive-force of unknown value and for connecting said galvanometer in series with said one of said resistances in place of said second of said resistances, whereby said galvanometer produces a deflection indicative of the value of the unknown electro-motive-force.

8. The combination with a plurality of resistances connected in series with each other, of a galvanometer and a source of electro-motive-force of unknown value connected in series with each other and in parallel with one of said resistances, means for passing through said resistances a current of magnitude causing in said one of said resistances a fall of potential equal to the unknown electro-motive-force of said source, a second of said resistances having a magnitude and temperature co-efficient equal to the magnitude and temperature co-efficient of the resistance of said galvanometer, and means for disconnecting said source of electro-motive-force of unknown value and for connecting said galvanometer in series with said one of said resistances in place of said second of said resistances, whereby said galvanometer produces a deflection indicative of the value of the unknown electro-motive-force.

9. The combination with a plurality of resistances connected in series with each other, of a galvanometer and a source of electro-motive-force of unknown value connected in series with each other and in parallel with one of said resistances, said one of said resistances having a temperature co-efficient which is practically *nil*, means for passing through said resistances a current of magnitude causing in said one of said resistances a fall of potential equal to the unknown electro-motive-force of said source, a second of said resistances having a magnitude and temperature co-efficient equal to the magnitude and temperature co-efficient of the resistance of said galvanometer, and means for disconnecting said source of electro-motive-force of unknown value and for connecting said galvanometer in series with said one of said resistances in place of said second of said resistances, whereby said galvanometer produces a deflection indicative of the value of the unknown electro-motive-force.

10. The combination with a circuit including a source of current and resistance, of a branch circuit connected in parallel with a part of said circuit, a plurality of resistances connected in series with each other in said branch circuit, a galvanometer and a source of electro-motive-force of unknown value connected in series with each other and in parallel with one of said resistances of said branch circuit, means for adjusting the strength of current in said one of said resistances to a magnitude causing therein a fall of potential equal to the unknown electro-motive-force of said source, and means for disconnecting said source of electro-motive-force of unknown value and for connecting said galvanometer in series with said one of said resistances in said branch circuit in place of a second resistance in said branch circuit.

11. The combination with a circuit including a source of current and resistance, of a branch circuit connected in parallel with a part of said circuit, a plurality of resistances connected in series with each other in said branch circuit, a galvanometer and a source of electro-motive-force of unknown value connected in series with each other and in parallel with one of said resistances of said branch circuit, said one of said resistances having a temperature co-efficient which is practically *nil*, means for adjusting the strength of current in said one of said resistances to a magnitude causing therein a fall of potential equal to the electro-motive-force of said source, and means for disconnecting said source of electro-motive-force of unknown value and for connecting said galvanometer in series with said one of said resistances in said branch circuit in place of a second resistance in said branch circuit.

12. The combination with a circuit including a source of current and resistance, of a branch circuit connected in parallel with a part of said circuit, a plurality of resistances connected in series with each other in said branch circuit, a galvanometer and a source of electro-motive-force of unknown value connected in series with each other and in parallel with one of said resistances of said branch circuit, means for adjusting the strength of current in said one of said resistances to a magnitude causing therein a fall of potential equal to the unknown electro-motive-force of said source, and means for disconnecting said source of electro-motive-force of unknown value and for connecting said galvanometer in series with said one of said resistances in said branch circuit in place of a second resistance in said branch circuit, said second of said resistances being equal in magnitude to the resistance of said galvanometer.

13. The combination with a circuit including a source of current and resistance, of a branch circuit connected in parallel with a part of said circuit, a plurality of resistances connected in series with each other in said branch circuit, a galvanometer and a source of electro-motive-force of unknown value connected in series with each other and in parallel with one of said resistances of said branch circuit, said one of said resistances having a temperature co-efficient which is practically *nil*, means for adjusting the strength of current in said one of said resistances to a magnitude causing therein a fall of potential equal to the electro-motive-force of said source, and means for disconnecting said source of electro-motive-force of unknown value and for connecting said galvanometer in series with said one of said resistances in said branch circuit in place of a second resistance in said branch circuit, said second of said resistances being equal in magnitude to the resistance of said galvanometer.

14. The combination with a circuit including a source of current and a resistance, of a branch circuit connected in parallel with said resistance and including a plurality of serially connected resistances, a galvanometer and a source of electro-motive-force of unknown value connected in series with each other and in parallel with one of said resistances of said branch circuit, means for adjusting the strength of current through said last named resistance to a magnitude causing therein a fall of potential equal to the unknown electro-motive-force of said source, said means comprising means for varying the amount of a second of said resistances in said branch circuit and for varying the amount of said first named resistance with which said branch circuit is in parallel, and means for disconnecting said source of electro-motive-force of unknown value and for connecting said galvanometer in circuit with said second of said resistances of said branch circuit.

15. The combination with a circuit including a source of current and a resistance, of a branch circuit connected in parallel with said resistance and including a plurality of serially connected resistances, a galvanometer and a source of electro-motive-force of unknown value connected in series with each other and in parallel with one of said resistances of said branch circuit, means for adjusting the strength of current through said last named resistance to a magnitude causing therein a fall of potential equal to the unknown electro-motive-force of said source, said means comprising contacts engaging and movable together along said first named resistance and a second of said resistances of said branch circuit to vary the amount of said second of said resistances in said branch circuit and to vary the amount of said first named resistance in parallel with which said branch circuit is connected, and means for disconnecting said source of electro-motive-force of unknown value and for connecting said galvanometer in circuit with said second of said resistances of said branch circuit.

16. The combination with a plurality of serially connected resistances, one of said resistances having a temperature co-efficient which is practically *nil*, of a galvanometer and a thermo-couple connected in series with each other and in parallel with said one of said resistances, said galvanometer comprising a coil movable in a permanent magnet field, means for passing a current through said resistances, means for adjusting said current to a magnitude causing in said one of said resistances a fall of potential equal to the electro-motive-force produced by said thermo-couple, a second of said resistances having a magnitude and temperature co-efficient equal to the magnitude and temperature co-efficient of the resistance of said galvanometer, and means for disconnecting said thermo-couple and for connecting said galvanometer in series with said one of said resistances in place of said second of said resistances, whereby said galvanometer produces a deflection indicative of the difference in temperature between the hot and cold junctions of said thermo-couple.

In testimony whereof I have hereunto affixed my signature this 12th day of May, 1917.

EDWIN F. NORTHRUP.